United States Patent Office 3,212,906
Patented Oct. 19, 1965

3,212,906
PROCESS FOR PRESERVING EGGS
Eynon Jones, Oakland, Calif., assignor to Twin Peaks Milk Products, Inc., San Francisco, Calif., a corporation of California
No Drawing. Filed Aug. 1, 1962, Ser. No. 213,890
4 Claims. (Cl. 99—161)

This invention relates to preserved liquid eggs and to an improved method for producing preserved liquid eggs. It relates specifically to whole eggs, egg yolks and egg whites in the liquid, frozen and dehydrated state alike.

It is an object of this invention to provide bacteriostatic egg products of the character described in which there is a virtual absence of bacteria and pathogenic microorganisms, particularly Salmonella. It is a further object of this invention to provide a process for producing such egg products from a variety of starting materials including whole eggs, egg yolks and egg whites in the liquid, frozen and dehydrated state which is applicable to such products even if the starting ingredients have been microbiologically contaminated or otherwise deteriorated. It is still another object of this invention to provide a process for producing such egg products in which it is unnecessary to desugar the ingredients which are to be preserved.

The foregoing objects, and other objects of this invention which will become apparent to those skilled in the art from a complete understanding of this specification, are based upon the discovery (a) that egg materials may be acidified below a pH of 4.0 if prior to acidification the material is heated to the point of incipient coagulation and (b) that if it is thereafter acidified, the product remains bacteriostatic if it has been heated as hereinafter set forth. The following preferred alternative examples of my invention illustrate alternative procedures for obtaining the results of this invention.

EXAMPLE 1

Liquid whole eggs as initially obtained from the shell are thoroughly mixed, and are elevated without intervening treatment to a temperature of 165° F. for 6 seconds. Then the temperature is maintained above 143° F. for at least 3 minutes, only to comply with the U.S. Department of Agriculture regulations regarding pasteurization. Next, diluted hydrochloric acid is added quickly to the mixture with agitation to a pH of 3.9.

The resulting product retains its original natural color and is Salmonella free and is bacteriostatic within temperature ranges of 30° F. to 40° F. for periods of time in excess of one month. It does not stratify, nor precipitate, nor form sediment. It is more miscible than the prior art products which have been called to my attention.

The resulting product may be used in food preparation without further treatment where an acidity of 3.9 is satisfactory. Where such acidity is unsatisfactory, sodium hydroxide is used to neutralize the hydrochloric acid to the desired extent. As is well known, sodium chloride salt resulting from the neutralization is in and of itself an edible salt.

EXAMPLE 2

Dried whole egg powder is reconstituted with water and the reconstituted material is treated in the same manner as liquid whole eggs are treated in Example 1. In the practice of this example, if discolored and bacterially contaminated dry whole eggs are used, they are purified and freshened and have the same characteristics as whole eggs treated in accordance with Example 1 and will revert to their original natural color.

EXAMPLE 3

The egg product of either Example 1 or Example 2 is frozen. While frozen the product has a permanent shelf life. Upon being thawed the product may be used as a food product in accordance with the product of either Example 1 or Example 2.

EXAMPLE 4

Liquid egg yolks as initially obtained from the shell are treated in the same manner as liquid whole eggs are treated in Example 1 with a comparable end product with the exception that the product is preserved liquid egg yolk rather than preserved liquid whole egg.

EXAMPLE 5

Dried egg yolk powder is reconstituted with water and the procedures of Example 2 are followed with the substitution of dried egg yolk powder for dried whole egg powder. The resulting product is comparable to the resulting product of Example 4.

EXAMPLE 6

The egg product of either Example 4 or Example 5 is frozen. While frozen the product has a permanent shelf life. Upon being thawed the product may be used as a food product in accordance with the product of either Example 4 or Example 5.

EXAMPLE 7

Liquid egg whites are milled in a conventional mill to break down the fibrous materials. The temperature is then raised to a temperature of from about 125° F. to about 130° F. until they start to gel or flocculate. This is readily observable. At about 125° F. it ordinarily takes from between about 5 seconds and about 30 seconds and at about 130° F. it ordinarily takes from between about 2 seconds to about 10 seconds. In each case, and in ranges therebetween, the time-temperature relationship depends upon the amount of agitation in or the velocity of the product flow through whatever heating system may be used. By a simple visual inspection, it will be seen when gelling or flocculation occurs. This step is stopped as soon as either occurs. The question of which of the two phenomena will occur first depends largely upon the age and condition of the egg whites, but in either event the incipient gelling or flocculation becomes immediately apparent to any person of ordinary skill in the art. The product is then acidified with diluted hydrochloric acid to reduce the pH to 3.9. At this point the product thins out. Then the product temperature is raised to 155° F. for 6 seconds. The temperature is maintained thereafter above 143° F. for at least 3 minutes, only to comply with the U.S. Department of Agriculture regulations regarding pasteurization. The resulting product will have comparable characteristics to whole eggs treated in accordance with Example 1 and may be used for comparable purposes with the obvious distinction that the product is an egg white rather than a whole egg.

EXAMPLE 8

Dried egg white powder is reconstituted with water and the reconstituted material is treated in the same manner as liquid egg whites are treated in Example 7. The resulting product is comparable to the resulting product in Example 7 even if discolored and bacterially contaminated dry egg whites are used.

EXAMPLE 9

The egg product of either Example 7 or Example 8 is frozen. While frozen the product has a permanent shelf life. Upon being thawed the product may be used as a food product in accordance with the product of either Example 7 or Example 8.

EXAMPLE 10

The product resulting from any of the foregoing examples is spray dried in a conventional spray dryer in the same manner as is customary for spray drying any other egg products. The resulting dehydrated egg product may be kept at temperatures of from below freezing to 120° F. with an expected shelf life of more than one year. The resulting product displays unusually rapid powers of reconstitution and usually goes into solution in 7 seconds without agitation. Its pH value renders it particularly useful in cake mixes in which its acidity tends to neutralize the alkaline agents usually found in the cake mixes. Further, in mixes containing yeasts, the acidity enhances their activity. If the acidity is undesirable, sodium hydroxide is added to adjust the pH to the desired extent.

In the practice of this example the resulting powder has a natural color even when a highly discolored dehydrated product is used in the preparation of the end product of Examples 2.

*Critical factors of this invention*

The various examples of this invention differ from the known prior art known to applicant in three principal areas.

First, the prior art contains teachings that various forms of egg products may be acidified and then pasteurized. The critical difference of the present invention is that the acidification and final adjustment of the pH must follow the heating step and not precede it. The results of this invention are not obtainable if all acidification precedes heating. In this connection, the prior art acidification down to a pH of about 5.5 before heating may be practiced provided that final acidification to a range of 3.75 to 4.0 is performed after heating.

Secondly, the prior art contains teachings that the acidification of egg products is performed in the general area of a pH of about 5.5 to 6 with some teachings extending down to a pH of about 4. The results of my invention are not obtainable unless the end product has a pH of from 3.75 to 4.00. I have found that if a pH of as high as 4.05 is used that the egg product is not bacteriostatic. If a pH of under 3.75 is used then the amines of the egg product tend to break down and the product tends to develope a generally objectionable odor.

Thirdly, prior to the acidification the product must be heated to the point of incipient coagulation. As pointed out earlier in this specification this point is readily apparent to a person of ordinary skill in the art. As a guide to enable the practitioner to reach that point quickly and easily, the following table may be used in the case of whole eggs and egg yolks.

| Temperature, ° F.: | Time | |
|---|---|---|
| 143.6 | minutes | 25 |
| 145.4 | do | 16 |
| 147.2 | do | 10 |
| 149.0 | do | 6 |
| 150.8 | do | 4 |
| 158.0 | seconds | 38 |
| 161.0 | do | 15 |
| 165.0 | do | 6 |
| 168.0 | do | 2.4 |
| 176.0 | do | 0.4 |

For egg whites the following table will furnish a guide at which the incipient gelation will become visually apparent.

| Temperature ° F.: | Time | |
|---|---|---|
| 125 | seconds | 5–30 |
| 130 | do | 2–10 |

Fourthly, if it is desirable to have a pasteurized product, all times with respect to whole eggs and egg yolks should be adjusted so that the product temperature is at some stage maintained above 143° F. for at least 30 minutes in order to comply with the U.S. Department of Agriculture regulations regarding pasteurization. In the case of whole eggs and egg yolks this time-temperature relationship is inherent in the foregoing guide with respect to the first 5 items. With respect to the balance, the product temperature may be maintained at above 143° F. for at least 3 minutes without adversely affecting the results obtainable with this invention. In the case of egg whites the time-temperature relationship required for pasteurization may not be practiced prior to the acidification step because that practice results in complete gelation of the egg whites. However, after the acidification step, it is possible to pasteurize the egg white product by using the following table as a guide.

| Temperature ° F.: | Time | |
|---|---|---|
| 143.6 | minutes | 25 |
| 145.4 | do | 16 |
| 147.2 | do | 10 |

Within the limits set forth under the preceding heading, it will become apparent to those skilled in the art that various modifications from the specific examples may be made without departing from the spirit of the invention, the invention being defined in the following claims.

I claim:

1. The method of producing a bacteriostatic egg product which includes the step of heating an egg product selected from the class consisting of liquid whole egg, egg yolks and liquid egg whites to the point of incipient gelation, thereafter adjusting the pH to the range of 4.0 to 3.75, and pasteurizing the product simultaneously with the heating step in the case of whole egg and egg yolk products and subsequent to the adjustment of pH step in the case of egg white products.

2. The process of claim 1 in which the egg product is frozen.

3. The process of claim 1 in which the egg product is dehydrated after the practice of the process of said claim.

4. The process of claim 1 in which the starting material is a dehydrated egg product selected from the class consisting of dehydrated whole eggs, dehydrated egg yolks and dehydrated egg whites and in which said starting material is reconstituted prior to the practice of the process of said claim.

References Cited by the Examiner

UNITED STATES PATENTS

| 2,166,070 | 7/39 | Littlefield | 99—113 |
| 2,168,926 | 8/39 | Littlefield | 99—210 |
| 2,593,223 | 4/52 | Trelease et al. | 99—161 |
| 2,766,126 | 10/56 | Hawk | 99—182 |

A. LOUIS MONACELL, *Primary Examiner.*

ABRAHAM H. WINKELSTEIN, *Examiner.*